(12) United States Patent
Nesbitt et al.

(10) Patent No.: US 10,785,394 B2
(45) Date of Patent: Sep. 22, 2020

(54) IMAGING PERFORMANCE OPTIMIZATION METHODS FOR SEMICONDUCTOR WAFER INSPECTION

(71) Applicant: KLA-Tencor Corporation, Milpitas, CA (US)

(72) Inventors: Jeremy Nesbitt, San Jose, CA (US);
Joshua Knight, Napa, CA (US);
Timothy Russin, San Jose, CA (US);
Vadim Palshin, Castro Valley, CA (US); Suneet Luniya, Santa Clara, CA (US); Kevin Lai, Milpitas, CA (US);
Mike Murugan, Fremont, CA (US);
Mark Bailey, Roseville, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 15/207,364

(22) Filed: Jul. 11, 2016

(65) Prior Publication Data

US 2017/0061597 A1 Mar. 2, 2017

Related U.S. Application Data

(60) Provisional application No. 62/211,288, filed on Aug. 28, 2015.

(51) Int. Cl.
*H04N 5/225* (2006.01)
*G01N 21/956* (2006.01)
*G01N 21/95* (2006.01)
*G01M 11/08* (2006.01)

(52) U.S. Cl.
CPC ........ *H04N 5/2256* (2013.01); *G01M 11/081* (2013.01); *G01N 21/9501* (2013.01); *G01N 21/956* (2013.01)

(58) Field of Classification Search
CPC .... H04N 5/2256; G01N 21/956; G01N 11/00; G01M 11/00
USPC .......................................................... 348/87
See application file for complete search history.

(56) References Cited

U.S. PATENT DOCUMENTS

| | | | | |
|---|---|---|---|---|
| 6,563,564 B2 * | 5/2003 | de Mol | .............. | G03F 7/70216 355/52 |
| 7,019,910 B2 * | 3/2006 | Hoppen | ............. | G02B 21/0016 359/355 |
| 7,262,831 B2 * | 8/2007 | Akhssay | ............. | G03F 7/70258 355/52 |

(Continued)

FOREIGN PATENT DOCUMENTS

EP 1420301 A2 5/2004

OTHER PUBLICATIONS

International Search Report dated Nov. 18, 2016 for PCT/US2016/047610.

*Primary Examiner* — Christopher S Kelley
*Assistant Examiner* — Boubacar Abdou Tchoussou
(74) *Attorney, Agent, or Firm* — Suiter Swantz pc llo

(57) ABSTRACT

An inspection system may include an optical component configured to deliver inspection light to a subject and a detector configured to obtain an image of the subject based on the inspection light delivered to the subject. The inspection system may also include a processor in communication with the optical component and the detector. The processor may be configured to: measure an aberration of the optical component based on the image of the subject obtained by the detector; and adjust the optical component to compensate for a change in the aberration.

19 Claims, 5 Drawing Sheets

(56) References Cited

U.S. PATENT DOCUMENTS

| | | | |
|---|---|---|---|
| 8,027,813 B2 | 9/2011 | Slonaker | |
| 8,570,485 B2 | 10/2013 | Ye et al. | |
| 8,625,078 B2 | 1/2014 | Zhou et al. | |
| 2002/0186463 A1* | 12/2002 | Hoppen | G02B 21/0016 359/368 |
| 2004/0184030 A1 | 9/2004 | Liebchen | |
| 2006/0114437 A1* | 6/2006 | Akhssay | G03F 7/70258 355/55 |
| 2006/0203231 A1 | 9/2006 | Uto et al. | |
| 2009/0002835 A1 | 1/2009 | Prior | |
| 2009/0009741 A1 | 1/2009 | Okita et al. | |
| 2009/0015836 A1 | 1/2009 | Maeda | |
| 2011/0075151 A1* | 3/2011 | Jeong | G01N 21/956 356/453 |
| 2011/0141463 A1 | 6/2011 | Chikamatsu et al. | |
| 2011/0286001 A1* | 11/2011 | Taniguchi | G01N 21/21 356/445 |
| 2011/0315897 A1 | 12/2011 | Romanovsky et al. | |
| 2013/0044318 A1* | 2/2013 | Cho | G01N 21/211 356/369 |
| 2014/0268122 A1* | 9/2014 | Matsumoto | G01N 21/956 356/237.6 |
| 2015/0331326 A1* | 11/2015 | Zhao | G03F 7/70225 355/67 |

\* cited by examiner

IMAGING PERFORMANCE OPTIMIZATION METHODS FOR SEMICONDUCTOR WAFER INSPECTION

CROSS-REFERENCE TO RELATED APPLICATIONS

The present application claims the benefit under 35 U.S.C. § 119(e) of U.S. Provisional Application Ser. No. 62/211,288, filed Aug. 28, 2015. Said U.S. Provisional Application Ser. No. 62/211,288 is hereby incorporated by reference in its entirety.

TECHNICAL FIELD

The disclosure generally relates to the field of inspection systems, and particularly to semiconductor wafer inspection systems.

BACKGROUND

Thin polished plates such as silicon wafers and the like are a very important part of modern technology. A wafer, for instance, may refer to a thin slice of semiconductor material used in the fabrication of integrated circuits and other devices.

Wafers are subject to defect inspections, and as transistor densities increase, requirements for imaging performances of wafer inspection systems may increase as well. Factors that may affect (or compromise) the imaging performance of an inspection system may therefore need to be addressed in order to satisfy the increased performance requirement.

SUMMARY

The present disclosure is directed to an inspection system. The inspection system may include an optical component configured to deliver inspection light to a subject and a detector configured to obtain an image of the subject at least partially based on the inspection light delivered to the subject. The inspection system may also include a processor in communication with the optical component and the detector. The processor may be configured to: measure an aberration of the optical component based on the image of the subject obtained by the detector; and adjust the optical component to compensate for a change in the aberration.

A further embodiment of the present disclosure is an inspection system. The inspection system may include an optical component configured to deliver inspection light to a wafer and a detector configured to obtain an image of the wafer at least partially based on the inspection light delivered to the wafer. The inspection system may also include a processor in communication with the optical component and the detector. The processor may be configured to: measure an aberration of the optical component; and adjust the optical component to compensate for a change in the aberration.

An additional embodiment of the present disclosure is directed to a method for adjusting imaging performance of an inspection system. The method may include: delivering inspection light to a subject through an optical component; obtaining an image of the subject at least partially based on the inspection light delivered to the subject; measuring an aberration of the optical component based on the image of the subject; and adjusting the optical component to compensate for a change in the aberration.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
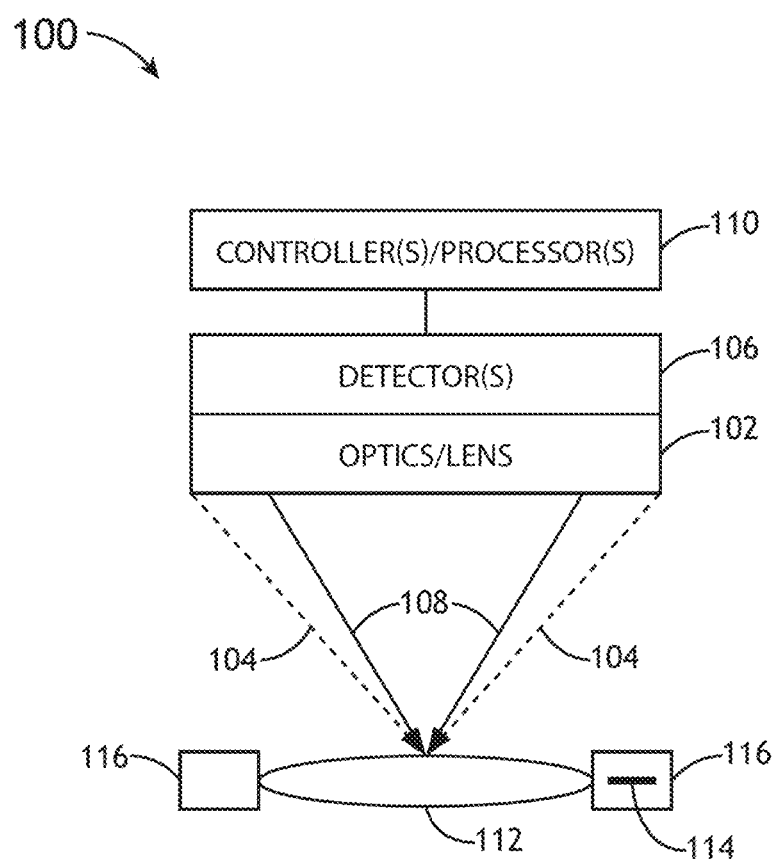
FIG. 1 is a block diagram depicting an inspection system configured in accordance with an embodiment of the present disclosure.

Embodiments in accordance with the present disclosure are directed to inspection systems and methods for adjusting/optimizing imaging performances of the inspection systems. FIG. 1 is a block diagram depicting an exemplary inspection system 100 configured in accordance with embodiments of the present disclosure.

As shown in FIG. 1, the inspection system 100 may include one or more optical components (e.g., lens) 102 configured to deliver inspection light 104 toward a subject of inspection (e.g., a wafer) 112. The inspection system 100 may also include one or more detectors 106 configured to obtain images of at least a portion of the wafer 112 based on the inspection light 104 delivered to the wafer. In some implementations, the detector(s) 106 may utilize autofocus light 108 to help obtain the images. It is noted that the focal planes of the autofocus light 108 and the inspection light 104 may need to overlap to maximize imaging performance.

Figure 2:
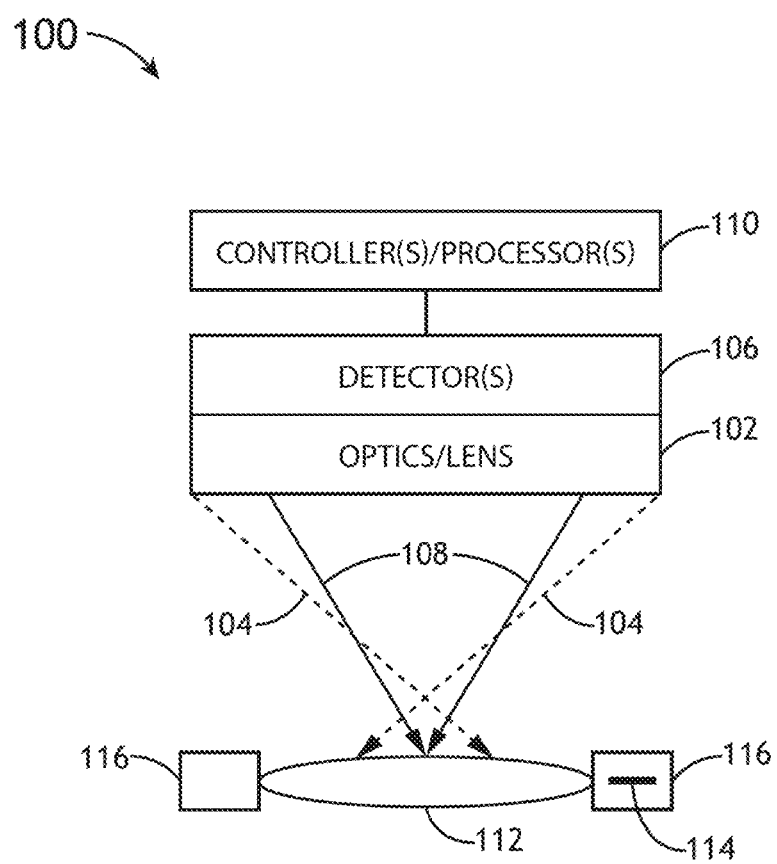
FIG. 2 is an illustration depicting a focus shift that may occur in an inspection system.

Referring now to FIG. 2, an exemplary scenario depicting a focal plane shift that may occur is shown. The shift may be caused by lens heating occurring at the optical component(s) 102, which may change the effective focal length of the inspection light 104 with respect to the effective focal length of the autofocus light 108. If this shift is uncompensated for, it may cause degradations that may affect the imaging performance of the inspection system 100.

The inspection system 100 configured in accordance with embodiments of the present disclosure may therefore include one or more processors 110 configured to carry out a method that is designed to address degradations in order to adjust/optimize the imaging performance of the inspection system 100. The processor(s) 110 may be implemented as dedicated processing units, application-specific integrated circuits (ASICs), field-programmable gate arrays (FPGAs) or various other types of processors or processing units. In some embodiments, the processor(s) 110 may be implemented as stand-alone components. Alternatively, the processor(s) 110 may be implemented as embedded computing components of the inspection system 100.

Figure 3:
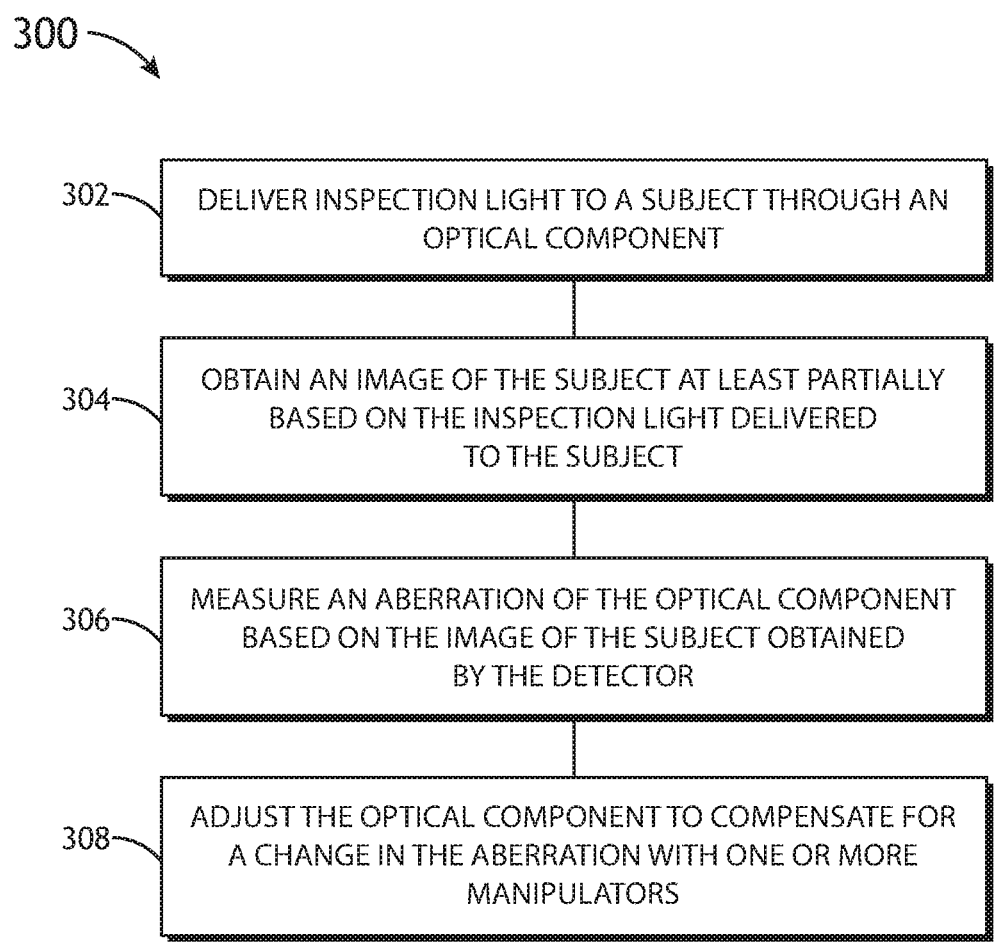
FIG. 3 is a flow diagram depicting an exemplary method configured for adjusting imaging performances of an inspection system.

FIG. 3 is a flow diagram depicting an exemplary method 300 configured for adjusting/optimizing the imaging performance of the inspection system 100. As shown in FIG. 3, the inspection light may be delivered to the subject of inspection in a step 302 and at least one image of the subject may be obtained in a step 304 at least partially based on the inspection light delivered to the subject. Aberrations of the optical component(s) 102 (e.g., lens aberrations) may then be measured in a measurement step 306. In some embodiments, the measurement step 306 may measure the aberrations by analyzing images collected from a reference/test chip 114, which may be movably or fixedly positioned in the field of view of the detector(s) 106 and held by a holding mechanism 116 so that it is coplanar with the wafer 112. Alternatively and/or additionally, the aberrations may be measured using a wavefront sensor or the like, and it is to be understood that other measurement techniques may be utilized to help measure the aberrations of the optical component(s) 102 without departing from the spirit and scope of the present disclosure.

With the aberrations of the optical component(s) 102 measured, a compensation step 308 may be carried out to compensate for any changes in the aberrations. In some embodiments, one or more aberration manipulators known to be parameters affecting the aberrations of the optical component(s) 102 may be selectively adjusted to change the aberrations of the optical component(s) 102 in order to compensate for the changes, which in turn may help reduce the focus shift and improve the imaging performance of the inspection system 100. The aberration manipulators may include, for example, lens decenter manipulators configured to adjust coma, linear astigmatism, and/or lateral color. The aberration may also be manipulated by adjusting stage displacement, which may in turn adjust the focus, or by adjusting the thickness of a glass plate to compensate for axial color.

Figure 4:
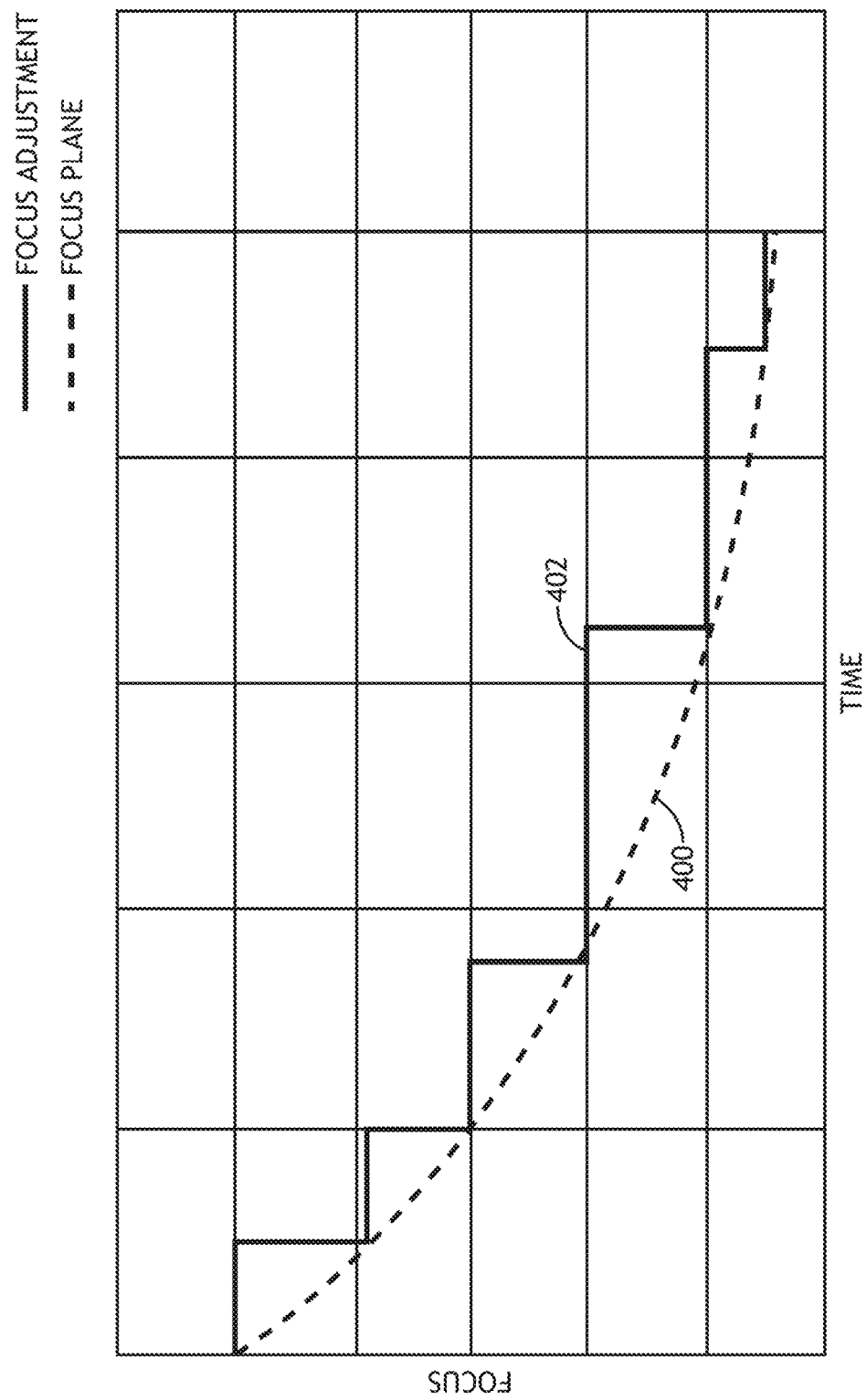
FIG. 4 is an illustration depicting some exemplary adjustments applicable to an inspection system.

It is contemplated that the method 300 may be carried out periodically by the processor(s) 110 to adjust the imaging performance of the inspection system 100 in order to keep the imaging performance of the inspection system 100 within an established error tolerance range. FIG. 4 is an illustration depicting some exemplary adjustments applicable to the inspection system 100 over time. More specifically, the curve 400 shows a simplified depiction of changes in the focal plane over time due to lens heating. The actual focal plane used for inspection is depicted using the curve 402. It is noted that the actual focal plane used for inspection may be adjusted to generally follow the curve 400. It is contemplated that the granularity of the adjustments may vary without departing from the spirit and the scope of the present disclosure.

Figure 5:
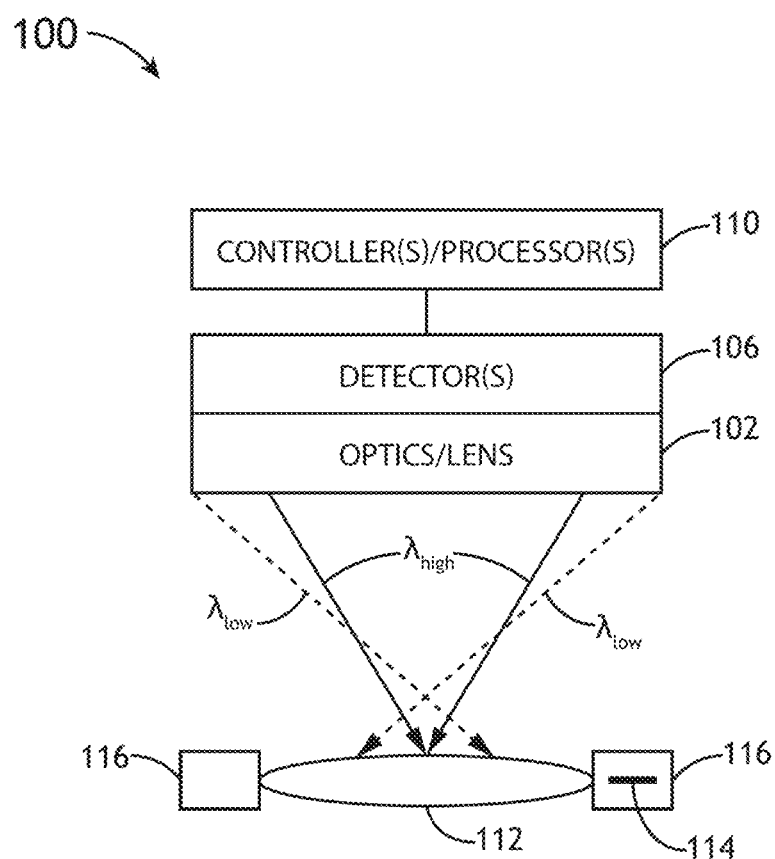
FIG. 5 is an illustration depicting effects of pressure changes on an inspection system.

It is also contemplated that while focus shift occurring due to lens heating is presented as a factor that may affect the imaging performance of the inspection system 100, lens heating is only one example of such factors. It is contemplated that the imaging performance of the inspection system 100 may change due to lens heating, pressure changes, temperature changes, as well as changes in other factors. FIG. 5, for example, is an illustration depicting effects of pressure changes on the imaging performance of the inspection system 100.

As shown in FIG. 5, pressure fluctuations (e.g., pressure changes during a storm) may cause aberrations resulting in the fact that different wavelengths ranging between $\lambda_{low}$ and $\lambda_{high}$ in the inspection light 104 may be focused at different locations. If this type of focus shift is uncompensated for, it may cause degradations that may affect the performance of the inspection system 100, especially if the inspection system 100 is performing broad band inspections.

It is contemplated that the method 300 described above may be utilized to effectively compensate for imaging performance degradations caused by pressure fluctuations. More specifically, aberrations (focus differences between different wavelengths in this example) may be measured in the measurement step 306 and the compensation step 308 may be carried out to compensate for the measured aberrations. If the measurement step 306 determines that the focus of a particular wavelength $\lambda$ is shifted by a certain amount, for example, the compensation step 308 may apply a manipulator (e.g., a glass plate or an environment index of refraction change) that alters the wavelength dependent optical path length to compensate for the shift.

It is also contemplated that the method 300 described above may be utilized to effectively compensate for imaging performance degradations caused by other factors in addition to lens heating and pressure fluctuations. It is to be understood that factors such as lens heating and pressure fluctuations are presented merely for illustrative purposes and are not meant to be limiting. It is contemplated that imaging performance degradations caused by other factors may be addressed in manners similar to that described above without departing from the spirit and the scope of the present disclosure.

It is further contemplated that the imaging performance degradations of the inspection system 100 may be modeled based on prior knowledge and/or historical data collected from past inspections. If a sufficiently accurate model can be generated to predict the degradations as a function of time, temperature, and pressure for a given optical mode, the manipulators may be adjusted accordingly to compensate for the predicted degradations without having to take measurements during the inspection, which may save time and reduce the cost of ownership of the inspection system 100.

On the other hand, if a model generated based on prior knowledge and/or historical data collected from past inspections is not deemed to be sufficiently accurate (e.g., suppose the curve 400 cannot be used to make sufficiently accurate predictions due to various reasons), measurements may still be needed during the inspection, and the curve 400 may be used as a merit function (e.g., where the merit function may be defined based on parameters including time, power, pressure, and/or temperature) to help determine when to trigger the one or more steps of the method 300. For example, suppose it is known from modeling that lens aberrations change significantly over a Y-minute period due to lens heating. Using this information along with performance requirements, the method 300 may be triggered when the amount of time elapsed since the last measurement is approaching the Y-minute mark (e.g., a threshold time or a threshold tau). It is contemplated that the method 300 may be triggered periodically to keep the imaging performance of the inspection system 100 within an established error tolerance range. It is also contemplated that the method 300 may be triggered continuously, intermittently, in response to a predetermined event, in response to a predetermined schedule, in response to a user request or command, or combinations thereof, without departing from the spirit and scope of the present disclosure.

As will be appreciated from the above, inspection systems and methods configured in accordance with the present disclosure can effectively address the various factors that may affect (or compromise) the performances of the inspection system. Aberrations can be measured and adjusted at the beginning of every inspection to optimize the imaging performance of the inspection system. Aberrations can also be measured and adjusted during the inspection to keep the error within a tolerance range, providing a feature that may be appreciated in various operating conditions.

It is to be understood that while the examples above referred to a wafer as the subject of inspection, the inspection systems configured in accordance with the present disclosure are not limited to inspecting wafers. The inspection systems configured in accordance with the present disclosure are applicable to other types of subjects as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

It is believed that the system and the apparatus of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. An inspection system, comprising:
   an optical component configured to deliver inspection light to a subject;
   one or more lens decenter manipulators configured to adjust the optical component when an aberration of the optical component is larger than a selected aberration level, wherein an adjustment of the one or more lens decenter manipulators shifts a focal plane of the inspection light directed through the optical component to overlap with a focal plane of an autofocus light;
   a detector configured to obtain an image of the subject at least partially based on the inspection light delivered to the subject; and
   a processor in communication with the optical component and the detector, the processor configured to:
      generate a model to determine a threshold time when an aberration of the optical component will exceed a selected aberration level, wherein the threshold time is an amount of time elapsed after a measurement of one or more control parameters of the one or more lens decenter manipulators occurs;
      adjust the optical component via adjustment of the one or more lens decenter manipulators to reduce the aberration of the optical component to be within the selected aberration level prior to inspection of the subject at the threshold time; and
      during inspection of the subject at the threshold time:
         measure the one or more control parameters to determine whether the aberration of the optical component is within the selected aberration level, wherein the one or more control parameters are based on at least one of time, power, temperature, or pressure; and
         upon determining the aberration of the optical component is larger than the selected aberration level, adjust the optical component via an adjustment of the one or more lens decenter manipulators to compensate for the aberration of the optical component being larger than the selected aberration level.

2. The inspection system of claim 1, wherein the subject includes a wafer.

3. The inspection system of claim 2, wherein the subject further includes a reference chip configured to be positioned in the field of view of the detector and configured to be held such that the reference chip is coplanar with the wafer when the inspection light is delivered to the wafer.

4. The inspection system of claim 3, wherein the processor is configured to measure the aberration of the optical component based on the image of the reference chip obtained by the detector.

5. The inspection system of claim 1, wherein the processor is further configured to model the aberration of the optical component as a function of the at least one of time, power, temperature, or pressure.

6. The inspection system of claim 5, wherein the processor is further configured to determine the threshold time based on the at least one of time, power, temperature, or pressure.

7. An inspection system, comprising:
   an optical component configured to deliver inspection light to a wafer;
   one or more lens decenter manipulators configured to adjust the optical component when an aberration of the optical component is larger than a selected aberration level, wherein an adjustment of the one or more lens decenter manipulators shifts a focal plane of the inspection light directed through the optical component to overlap with a focal plane of an autofocus light;
   a detector configured to obtain an image of the wafer at least partially based on the inspection light delivered to the wafer; and
   a processor in communication with the optical component and the detector, the processor configured to:
      generate a model to determine a threshold time when an aberration of the optical component will exceed a selected aberration level, wherein the threshold time is an amount of time elapsed after a measurement of one or more control parameters of the one or more lens decenter manipulators occurs;
      adjust the optical component via adjustment of the one or more lens decenter manipulators to reduce the aberration of the optical component to be within the selected aberration level prior to inspection of the wafer at the threshold time; and
      during inspection of the wafer at the threshold time:
         measure the one or more control parameters to determine whether the aberration of the optical component is within the selected aberration level; and
         upon determining the aberration of the optical component is larger than the selected aberration level, adjust the optical component via an adjustment of the one or more lens decenter manipulators to compensate for the aberration of the optical component being larger than the selected aberration level.

8. The inspection system of claim 7, further comprising:
   a reference chip configured to be positioned in the field of view of the detector and configured to be held such that the reference chip is coplanar with the wafer when the inspection light is delivered to the wafer.

9. The inspection system of claim 8, wherein the detector is further configured to obtain an image of the reference chip at least partially based on the inspection light delivered by the optical component and wherein the processor is further configured to measure the aberration of the optical component based on the image of the reference chip obtained by the detector.

10. The inspection system of claim 7, wherein the processor is further configured to model the aberration of the optical component as a function of one or more variables.

11. The inspection system of claim 10, wherein the aberration of the optical component is modeled as a function of at least one of time, power, temperature, or pressure.

12. The inspection system of claim 11, wherein the processor is further configured to determine the threshold time based on the at least one of time, power, temperature, or pressure.

13. A method for adjusting imaging performance of an inspection system, the method comprising:
   delivering inspection light to a subject through an optical component, wherein one or more lens decenter manipulators are configured to adjust the optical component when an aberration of the optical component is larger than a selected aberration level, wherein an adjustment of the one or more lens decenter manipulators shifts a focal plane of the inspection light directed through the optical component to overlap with a focal plane of an autofocus light;
   obtaining an image of the subject at least partially based on the inspection light delivered to the subject;
   generating a model to determine a threshold time when an aberration of the optical component will exceed a selected aberration level, wherein the threshold time is an amount of time elapsed after a measurement of one or more control parameters of one or more lens decenter manipulators occurs;
   adjusting the optical component via an adjustment of the one or more lens decenter manipulators to reduce the aberration of the optical component to be within the selected aberration level prior to inspection of the subject at the threshold time; and
   during inspection of the subject at the threshold time:
      measuring the one or more control parameters to determine whether the aberration of the optical component is within the selected aberration level, wherein the one or more control parameters are based on time, temperature, or pressure; and
      upon determining the aberration of the optical component is larger than the selected aberration level, adjusting the optical component via an adjustment of the one or more lens decenter manipulators to compensate for the aberration of the optical component being larger than the selected aberration level.

14. The method of claim 13, wherein the subject includes a reference chip and wherein the aberration of the optical component is measured based on the image of the reference chip.

15. The method of claim 13, further comprising:
   modeling the aberration of the optical component as a function of the time, temperature, or pressure.

16. The method of claim 15, further comprising:
   determining the threshold time at least partially based on the function of the time, temperature, or pressure.

17. The inspection system of claim 1, wherein the one or more control parameters are based on time, temperature, and pressure.

18. The inspection system of claim 7, wherein the one or more control parameters are based on time, temperature, and pressure.

19. The method of claim 13, wherein the one or more control parameters are based on time, temperature, and pressure.

* * * * *